(12) United States Patent
Bharghavan et al.

(10) Patent No.: US 8,295,177 B1
(45) Date of Patent: Oct. 23, 2012

(54) FLOW CLASSES

(75) Inventors: Vaduvur Bharghavan, Morgan Hill, CA (US); Shishir Varma, Bangalore (IN); Sung-Wook Han, Sunnyvale, CA (US)

(73) Assignee: Meru Networks, Sunnyvale, CA (US)

( * ) Notice: Subject to any disclaimer, the term of this patent is extended or adjusted under 35 U.S.C. 154(b) by 442 days.

(21) Appl. No.: 11/899,997

(22) Filed: Sep. 7, 2007

(51) Int. Cl.
*G01R 31/08* (2006.01)
(52) U.S. Cl. ........................ 370/235; 370/395.4; 370/392
(58) Field of Classification Search .................. 370/229, 370/231, 235, 392, 395.31, 395.4, 401
See application file for complete search history.

(56) References Cited

U.S. PATENT DOCUMENTS

| | | | |
|---|---|---|---|
| 6,341,130 B1 * | 1/2002 | Lakshman et al. | 370/389 |
| 6,594,268 B1 * | 7/2003 | Aukia et al. | 370/400 |
| 6,760,318 B1 | 7/2004 | Bims | |
| 6,788,658 B1 | 9/2004 | Bims | |
| 6,839,038 B2 | 1/2005 | Weinstein | |
| 6,894,649 B2 | 5/2005 | Ostervall | |
| 6,954,177 B2 | 10/2005 | Channabasappa et al. | |
| 7,894,347 B1 * | 2/2011 | Anker et al. | 370/235 |
| 2002/0097726 A1 * | 7/2002 | Garcia-Luna-Aceves et al. | 370/395.31 |
| 2003/0231640 A1 * | 12/2003 | Basso et al. | 370/401 |
| 2004/0100908 A1 * | 5/2004 | Khosravi et al. | 370/235 |

OTHER PUBLICATIONS

SRR: An O(1) Time Complexity Packet Scheduler for Flows in Multi-Service Packet Networks p. 211-222 Guo Chuanxiong 2001 http://delivery.acm.org/10.1145/390000/383076/p211-chuanxiong.pdf?key1=383076&key2=8683980621&coll=GUIDE&dl=GUIDE& CFID=66920465&CFTOKEN=98816513.*

* cited by examiner

*Primary Examiner* — Jung Park
(74) *Attorney, Agent, or Firm* — Swernofsky Law Group PC

(57) ABSTRACT

Flows are grouped into flow classes, each of which is assigned flow class treatment rules, which might combine application of both firewall and QoS treatments. When a flow is identified as a member of a flow class, traffic for that flow can be treated according to treatment rules collectively with other flows assigned to that flow class. New flows not already members of an already-defined flow class are examined according to a set of flow class assignment rules, which have the effect of either identifying the proper flow class for that flow, or creating a new flow class for that new flow. For each flow, a first packet determines flow assignment, after which succeeding packets are treated according that flow. For each flow class, a first flow determines flow class assignment, after which succeeding flows are collectively treated according to that flow class.

13 Claims, 3 Drawing Sheets

FLOW CLASSES

BACKGROUND

In some systems, packets are assigned to flows, each of which represents a logical set of packets being transferred between a pair of communicating devices.

One problem in the known art is that there are certain activities for application to flows, e.g., QoS (quality of service), that are not dependent on any one particular flow, but are applicable across a collection of more than one flow. For a first example, it might be desirable to limit the amount of traffic for communication using a UDP protocol, regardless of which flows those are. For a second example, it might be desirable apply a more limited set of QoS rules to the set of all "guest" users, while applying a less limited set of QoS rules to the set of all registered users (e.g., those with known accounts). For a third example, it might be desirable to apply a combination of firewall and QoS rules for traffic, depending on the type of application, communication protocol, and location of the users.

DESCRIPTION OF THE EMBODIMENT

Nature of the Description

Read this application in its most general form. This includes, without limitation:
- References to specific structures or techniques include alternative or more general structures or techniques, especially when discussing aspects of the invention, or how the invention might be made or used.
- References to "preferred" structures or techniques generally mean that the inventor contemplates using those structures are techniques, and think they are best for the intended application. This does not exclude other structures or techniques for the invention, and does not mean that the preferred structures or techniques would necessarily be preferred in all circumstances.
- References to $1^{st}$ contemplated causes or effects for some implementations do not preclude other causes or effects that might occur in other implementations, even if completely contrary, where circumstances would indicate that the $1^{st}$ contemplated causes or effects would not be as determinative of the structures or techniques to be selected for actual use.
- References to $1^{st}$ reasons for using particular structures or techniques do not preclude other reasons or other structures or techniques, even if completely contrary, where circumstances would indicate that the $1^{st}$ structures or techniques are not as compelling. The invention includes those other reasons or other structures or techniques, especially where circumstances would indicate they would achieve the same effect or purpose as the $1^{st}$ reasons, structures, or techniques.

OVERVIEW OF THE DESCRIPTION

Sets of flows are grouped into "flow classes", as described herein, each of which is assigned one or more rules for how that flow class is to be treated. Treatment rules for flow classes might combine application of both firewall and QoS treatments. This has the effect that when a flow is identified as a member of a flow class, traffic for that flow can be treated according to treatment rules for that flow class, collectively with other flows assigned to that flow class.

In one embodiment, when a new flow is detected that is not a member of an already-defined flow class, a set of flow class assignment rules might be applied to that new flow. These flow class assignment rules might have the effect of creating a new flow class for that new flow, to which other new flows might be assigned, or might have the effect of creating a new flow class that is substantially unique to that new flow.

In one embodiment, a set of flow assignment rules and a flow table are maintained for assigning packets to flows. A set of flow class assignment rules and a flow class table are maintained for assigning flows to flow classes. This has the effect that, for each flow, a first packet in that flow involves determining to which flow that packet is assigned, after which succeeding packets in that flow can be treated according to rules associated with that flow. This also has the effect that, for each flow class, a first flow in that flow class involves determining to which flow class that flow is assigned, after which succeeding flows in that flow class can be treated according to rules associated with that flow class.

In one embodiment, the flow table and the flow class table are each maintained as hash tables, content-addressable memories, or other bounded-time lookup structures. This has the effect that it takes only O(1) time, i.e., bounded to within constant time, to determine according to which flow rules to treat each succeeding packet in a flow after the first one. This also has the effect that it takes only O(1) time, i.e., bounded to within constant time, to determine according to which flow class rules to treat each succeeding flow in a flow class after the first one.

Terms and Phrases

Read this application with the following terms and phrases in their most general form. The general meaning of each of these terms or phrases is illustrative, not in any way limiting.
- The terms "firewall", "QoS", and variants thereof, and the phrases "quality of service", and variants thereof, generally refer to network forwarding, priority, traffic policing, and traffic shaping treatments assigned to packets, flows, or flow classes.
  Although this application provides greater detail regarding embodiments in which firewall and QoS treatments primarily act according to an IEEE 802 protocol variant, there is no particular reason to limit any part of this application in this regard.
- The term "flow", and variants thereof, generally refers to any collection of packets assigned to be treated in similar ways.
  Although this application provides greater detail regarding embodiments in which flows are responsive to source/destination addresses and ports, and are responsive to message protocols, there is no particular reason to limit any part of this application in this regard.
- The phrase "flow class", and variants thereof, generally refers to any collection of flows for which a collective treatment rule is assigned to be applied to flows within that flow class.
  Although this application provides greater detail regarding embodiments in which flow classes are responsive to elements to which flows are responsive to, are responsive to source/destination subnet masks, and are responsive to source/destination MAC addresses and possibly other tags, for example based on class of users or location of devices or other administratively defined attributes of users or devices, there is no particular reason to limit any part of this application in this regard.
- The term "packet", and variants thereof, generally refers to any message capable of being sent from one device to one or more destination devices.
  Although this application provides greater detail regarding embodiments in which packets primarily act according to an IEEE 802 protocol variant, there is no particular reason to limit any part of this application in this regard.

The phrase "treatment rule", and variants thereof, and the term "rule", and variants thereof, generally refer to any method of assigning network routing or priority to packets, flows, or flow classes.

Although this application provides greater detail regarding embodiments in which network routing and priority treatments primarily act according to an IEEE 802 protocol variant, there is no particular reason to limit any part of this application in this regard.

FIGURES AND TEXT

FIG. 1

Figure 1:
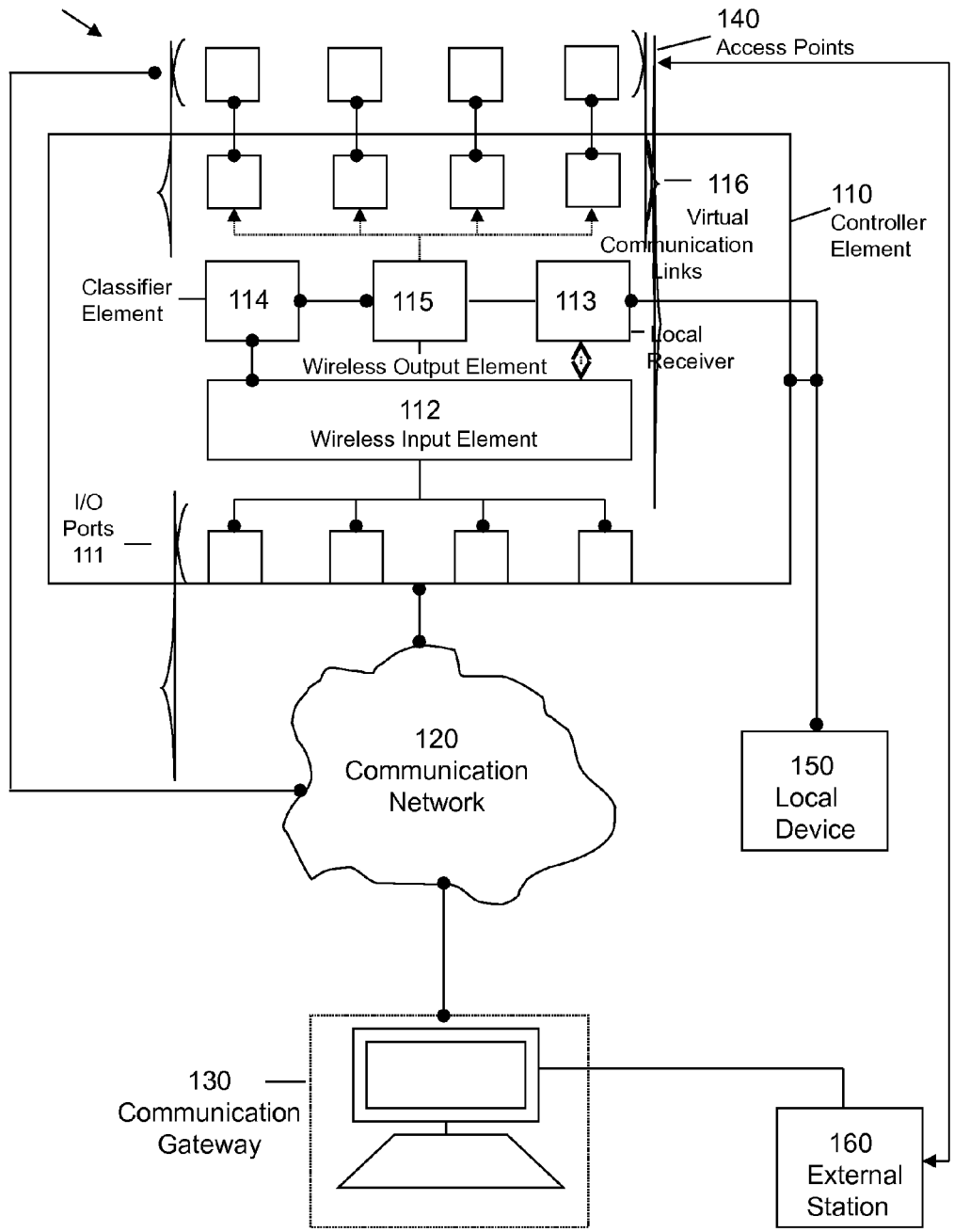
FIG. 1 illustrates a block diagram of a system, according to an embodiment.

A FIG. 1 shows a block diagram of a system.

A system 100 includes elements as represented in the FIG. 1, including at least: a controller element 110, a communication network 120, a communication gateway 130, and a set of access points 140.

Controller

The controller element 110 includes elements as represented in the FIG. 1, including at least: one or more I/O ports 111, a wireless input element 112, a local receiver 113, a classifier element 114, a wireless output element 115, and one or more virtual communication links 116.

The one or more I/O ports 111 might include Ethernet LAN (local area network) ports, capable of receiving messages from, and sending messages to, the communication network 120.

The wireless input element 112 is operatively coupled to the one or more I/O ports 111, and is capable of determining whether input messages are directed to one or more local devices 150 (not part of the system 100), those local devices 150 being operatively coupled to the controller element 110.

In cases in which the wireless input element 112 determines that input messages are directed to one or more local devices 150, the wireless input element 112 intercepts those messages, removing them from the message flow, and direct them to the one or more local devices 150.

The local receiver 113 is operatively coupled to the one or more local devices 150 (not part of the system 100), and is capable of delivering messages from the wireless input element 112 to those local devices 150.

In cases in which the wireless input element 112 direct messages to those one or more local devices 150, the local receiver 113 operatively couples those messages to those one or more local devices 150. The local receiver 113 might use known routing techniques, or might use routing techniques as described herein.

The classifier element 114 is operatively coupled to the wireless input element 112, and is capable of classifying and routing messages directly to destinations other than the one or more local devices 150, as described below in other and further detail.

The classifier element 114 operates to identify packets as part of flows, and operates to identify flows as part of flow classes, as described herein. Upon identifying packets as part of flows, and upon identifying flows as part of flow classes, the classifier element 114 applies flow treatment rules to those flows, and applies flow class treatment rules to those flow classes, as described herein.

The wireless output element 115 is operatively coupled to the classifier element 114, and is capable of delivering messages to the one or more access points 140, each using its assigned virtual communication link 116.

Communication

The communication network 120 includes elements as represented in the FIG. 1, including at least: an L2/L3 backbone including a set of communication subnet processors (e.g., routers) capable of routing messages from sending devices to one or more destination devices.

The communication network 120 is operatively coupled to the controller element 110, in one embodiment, to the one or more I/O ports 111 of the controller element 110.

Gateway

The communication gateway 130 includes elements as represented in the FIG. 1, including at least: a computing device capable of receiving messages from one or more external stations 160 (not part of the system 100) and routing those messages to the communication network 120.

The communication gateway 130 is operatively coupled to the communication network 120.

Access Points

The access points 140 include elements as represented in the FIG. 1, including at least: circuits capable of receiving messages from the controller element 110 or from the communication network 120 and routing those messages to one or more external stations 160 (not part of the system 100).

The access points 140 are operatively coupled to the controller element 110, in one embodiment, each to an assigned virtual communication link 116, and to the communication network 120.

In one embodiment, the access points 140 are capable of wireless communication with one or more external stations 160 (not part of the system 100).

FIG. 2

Figure 2:
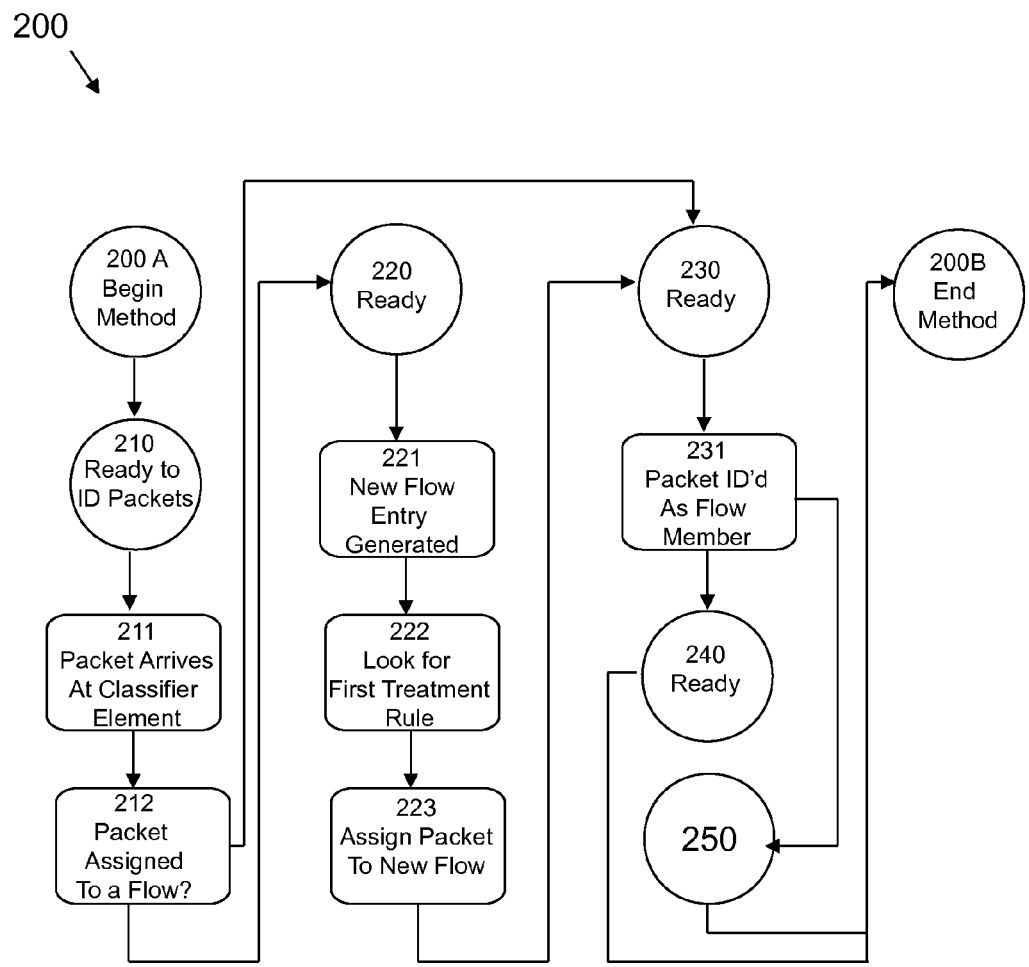
FIG. 2 illustrates a block diagram of a system, according to an embodiment.

A FIG. 2 shows a process diagram of a method.

A method 200 includes labels and process steps as represented in the FIG. 2, including at least the following:

Beginning of Method

A label 200A indicates a beginning of the method 200. The method proceeds with a label 210.

Flow Identification

A label 210 indicates that the method 200 is ready to identify packets as part of flows.

At a step 211, a packet arrives at the classifier element 114.

At a step 212, the classifier element 114 determines if the packet is assigned to a flow in the flow table.

In one embodiment, the classifier element 114 performs a hash-table lookup in a flow table 201 (maintained in a memory in the controller element 110, as shown in the FIG. 1) in response to the source/destination address and port values, and the protocol identifier. These five values (IP source address, IP source port, IP destination address, IP destination port, and IP protocol identifier) are sometimes referred to herein as a five-tuple. Using a hash-table for lookup in response to the packet five-tuple has the effect of taking O(1), i.e., bounded constant time, to perform the lookup operation.

If the classifier element 114 determines that the flow is present in the flow table 201, the classifier element 114 obtains routing treatment information for the packet from routing treatment information associated with the flow that the packet was found to be associated with. The method 200 proceeds with the label 230.

If the classifier element 114 determines otherwise, i.e., that the flow is not present in the flow table 201, the method 200 proceeds with the label 220.

New Flow Creation

A label 220 indicates that the method 200 is ready to create a new flow for the newly-arrived packet.

At a step 221, the classifier element 114 generates a new flow entry in the flow table 201, in response to the packet five-tuple.

At a step 222, the classifier element 114 examines each treatment rule in a flow treatment rule list 202 (maintained in a memory in the controller element 110, as shown in the FIG. 1), looking for a first treatment rule to which the new flow entry should be assigned.

In one embodiment, the classifier element 114 performs a linear search of the flow treatment rule list 202 in response to the source/destination address and port values, the protocol identifier, i.e., the five-tuple described above including the five values (source address, source port, destination address, destination port, and protocol identifier), as well as other attributes of the source and destination such as administratively defined "tags" that might denote the class of user, the current location of the user, or other information.

Using a linear search for lookup in response to the packet attributes has the effect of taking $O(n)$, i.e., linear time in the length of the flow treatment rule list 202, to perform the lookup operation. In alternative embodiments, using an optimized search technique such as tree-based search, or multi-level trie based search, would have the effect of taking only $O(\ln n)$ time to perform the lookup operation, where n is a number of entries in the flow treatment rule list 202.

At a step 223, the classifier element 114 generates a new flow in response to the flow treatment rule list 202, and enters that new flow in the flow list 201.

At a step 223, the classifier element 114 assigns the packet to that new flow that was just entered in the flow list 201.

In one embodiment, a default treatment rule is disposed as the final element of the flow treatment rule list, that default treatment rule including whatever default treatment rule should be assigned to those flows that cannot be identified in the flow treatment rule list. In one embodiment, the default treatment rule is to discard all packets in any such flows. In alternative embodiments, the default treatment rule may be to classify all such flows into a default flow class.

The method proceeds with a label 230.

Flow Group Identification

A label 230 indicates that the method 200 is ready flows as part of flow groups.

At a step 231, the packet has been identified as a member of a flow, either an earlier-identified flow (at the step 212) or a newly-generated flow (at the step 222).

At a step 212, the classifier element 114 determines if the flow is assigned to a flow group.

In one embodiment, the classifier element 114 performs a hash-table lookup in a flow group table 203 (maintained in a memory in the controller element 110, as shown in the FIG. 1) in response to the flow identifier, the five-tuple used to identify the flow, as well as a set of additional information. In one embodiment, that additional information includes a MAC source address, a MAC destination address, any flags assigned to the flow by the classifier element 114 as part of the classification process, and possibly a tag (sometimes described as a "filterID") that can be matched to a corresponding attribute associated with the source or destination of the packet, or some feature of the flow useful to classification of flow groups.

This has the effect that the hash-table lookup in the flow group table 203 is responsive to the unique flow class column 330 (described below with respect to the FIG. 3), as well as other descriptive information about the flow. In one embodiment, each flow for which the unique flow class column 330 is set is assigned to a unique flow class, with the effect that they hash table lookup in response to that flow class column 330 has the effect of taking $O(1)$, i.e., bounded constant time, to perform the lookup operation.

Using the tag, matchable to a corresponding attribute associated with the source or destination of the packet, has the useful property that flow classes might be defined in response to location of device. This has the effect that flow classes might treat flows in response to a combination of which users are involved in those flows, which applications are involved in those flows, which are involved in those flows, and other factors.

If the classifier element 114 determines that the flow is present in the flow group table 203, the classifier element 114 obtains treatment information (e.g., firewalling and QoS treatment information) for the flow from treatment information associated with the flow group that the flow was found to be associated with. The method 200 proceeds with the label 250.

In one embodiment, if the flow is present in the flow group table 203, the treatment information associated with the flow group overrides treatment information for the flow. This has the effect that, a flow can be "hijacked", i.e., modified, redirected, or otherwise flexibly treated other than the flow would naturally be treated according to a known flow routing procedure.

If the classifier element 114 determines otherwise, i.e., that the flow is not present in the flow group table 203, the method 200 proceeds with the label 240.

New Flow Group Creation

A label 240 indicates that the method 200 is ready to create a new flow for the newly-arrived packet.

At a step 221, the classifier element 114 examines each treatment rule in a flow group treatment rule list 204 (maintained in a memory in the controller element 110, as shown in the FIG. 1), looking for a first treatment rule to which the new flow group entry should be assigned.

In one embodiment, the classifier element 114 performs a linear search of the flow group treatment rule list 204 in response to the information used to identify the nature of the flow.

Using a linear search for lookup in response to the information used to identify the nature of the flow has the effect of taking $O(n)$, i.e., linear time in the length of the flow group treatment rule list 204, to perform the lookup operation. In alternative embodiments, using an optimized search technique such as tree-based search, or multi-level trie based search, would have the effect of taking only $O(\ln m)$ time to perform the lookup operation, where m is a number of entries in the flow group treatment rule list 204.

At a step 222, the classifier element 114 generates a new flow group entry in the flow group table 203, in response to the information used to identify the nature of the flow.

At a step 223, the classifier element 114 assigns the flow to that new flow group that was just entered in the flow group list 203.

Using the flow group treatment rule list 204 has the useful property that flow classes might be created that are generic aggregations of any combination of identifying features of any particular flow, without sacrificing any speed in flow class lookup. This has the effect that flows might be aggregated into flow classes of relatively complex nature, without sacrificing O(1) lookup time, i.e., bounded to within constant time for lookup.

At a step 223, the classifier element 114 assigns the flow to that new flow group that was just entered in the flow group list 203.

In one embodiment, a default treatment rule is disposed as the final element of the flow treatment rule list, that default treatment rule including whatever default treatment rule should be assigned to those flows that cannot be identified in the flow treatment rule list. In one embodiment, the default treatment rule is to discard all packets in any such flows.

The method proceeds with a label 200B.

End of Method

A label 200B indicates an end of the method 200.

FIG. 3

Figure 3:
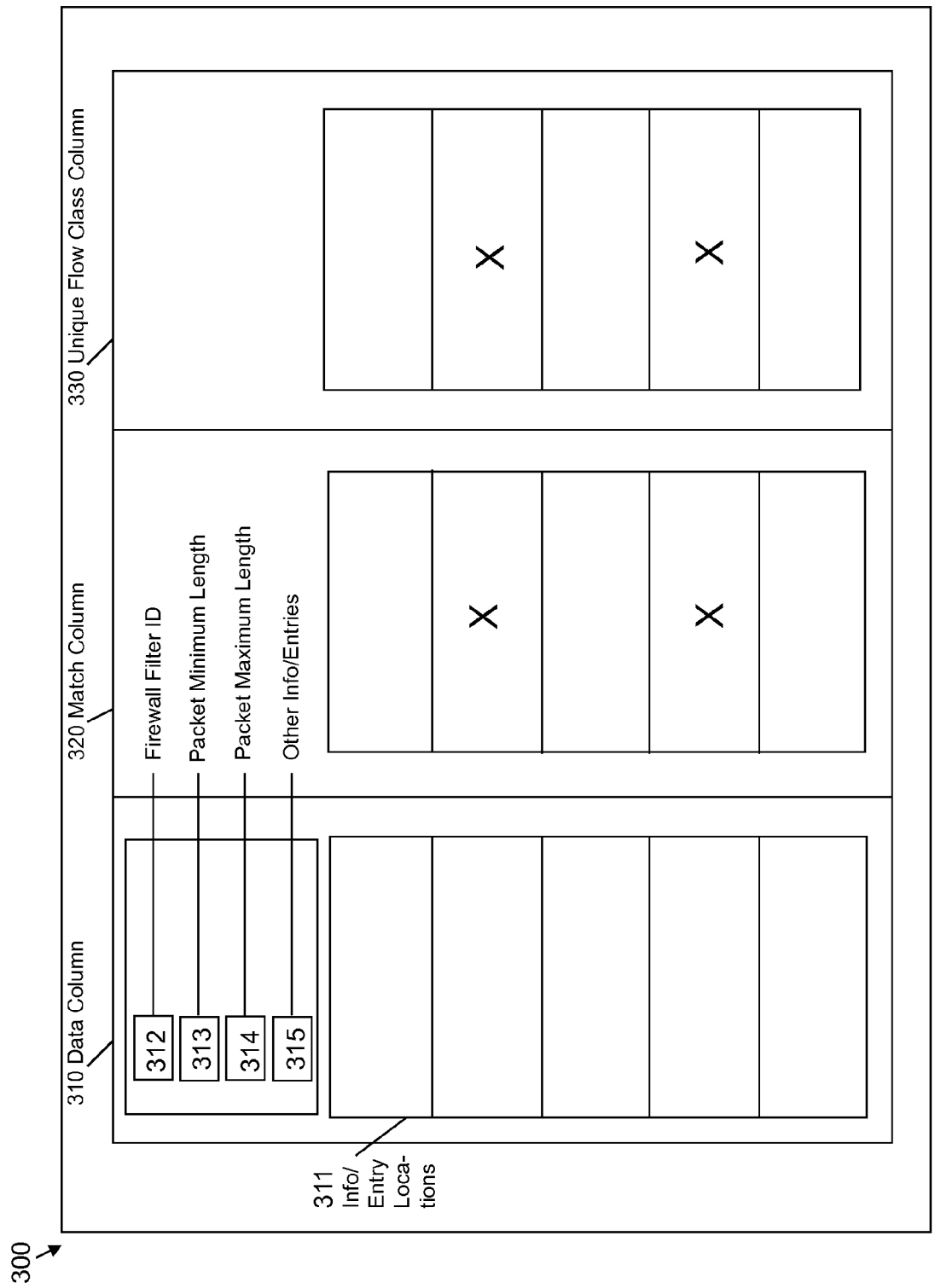
FIG. 3 illustrates a schematic diagram of an administrative flow group rule creation screen, according to an embodiment.

A FIG. 3 shows an administrative flow group rule creation screen.

A screen 300 includes information and entry locations as represented in the FIG. 3, including at least the following: a data column 310, a match column 320, an unique flow class column 330.

The data column 310 includes information and entry locations as represented in the FIG. 3, including at least the following: a set 311 of information and entry locations identifying a five-tuple for a flow. In one embodiment, this set 311 of information and entry locations includes
 . . . an IP destination identifier
 . . . an IP destination identifier subnet mask
 . . . an IP destination port identifier
 . . . an IP source identifier
 . . . an IP source identifier subnet mask
 . . . an IP source port identifier
 . . . an IP network protocol identifier
 . . . an administratively defined tag, that might be set corresponding to the source or destination of the packet based on class of user, location of device, or other attributes Each of these entry locations includes a position for information to be filled-in, with the effect that the classifier element 114 attempts to identify flows whose corresponding information equals the information filled-in for each of these entry locations.

The match column 320 indicates, for entries in the data column 310, which of those entries in the data column 310 the classifier element 114 is to actually consider in attempting to identify flows whose corresponding information equals the information filled-in for each of these entry locations.

If the match column 320 has a corresponding entry marked (as shown in the FIG. 3, with a check-mark), the classifier element 114 acts responsive to whether each individual flow has its corresponding information equal to the information filled-in for each of these entry locations. In contrast, if the match column 320 has a corresponding entry unmarked (as shown in the FIG. 3, with a blank entry), the classifier element 114 ignores whether individual flow has its corresponding information equal to the information filled-in for each of these entry locations. This has the effect that, when the match column 320 has an entry unmarked, the corresponding entry in the data column 310 is treated as a so-called "wild card", i.e., any value is considered a match.

If the unique flow class column 330 has a corresponding entry marked (as shown in the FIG. 3, with a check-mark), each flow matching that corresponding information is treated as part of a separate flow group. In contrast, if the match column 320 has a corresponding entry unmarked (as shown in the FIG. 3, with a blank entry), all flows with information of the nature identified in the data column 310 are treated as part of a single flow group, i.e., a single flow group includes collective rules for all the flows in that one flow group.

The data column 310 also includes additional information and entry locations as represented in the FIG. 3, including at least the following: a location 312 for information and entry indicating a firewall filter ID, a location 313 for information and entry indicating a packet minimum length, a location 314 for information and entry indicating a packet maximum length, and a further set 315 of other information and entries. In one embodiment, this further set 315 includes
 . . . a QoS protocol value
 . . . an average packet rate value, identified in a co-pending application
 . . . an action policy, i.e., an action to be taken for packets in flows in that flow group
 . . . a packet drop policy, i.e., a policy for dropping packets to be taken for packets in flows in that flow group
 . . . a token bucket rate value, identified in a co-pending application
 . . . a priority value, i.e., a priority to be applied to packets in flows in that flow group
 . . . possibly other values specific to particular embodiments.

The average packet rate value and token bucket rate value are described in other and further detail in co-pending applications identified herein, hereby incorporated by reference as if fully set forth herein.

ALTERNATIVE EMBODIMENTS

After reading this application, those skilled in the art will recognize that the invention has wide applicability, and is not limited to the embodiments described herein.

The invention claimed is:

1. A method, including steps of receiving a 1st packet at a router;
 identifying a flow associated with said $1^{st}$ packet;
 identifying a flow class associated with said flow, said flow class being responsive to a plurality of distinct flow class assignment rules;
 maintaining a set of treatment information in response to said flow class, said treatment information including at least one administrative policy; and
 setting said router in a configuration capable of routing a $2^{nd}$ packet with respect to said flow and with respect to said flow class and according to said treatment information associated with said flow class in O(1) time with respect to a number of said flows and with respect to a number of said flow classes.

2. A method as in claim 1, wherein
 in response to said treatment information, said router applies a set of firewall or QoS rules to traffic associated with said flow class, said firewall or QoS rules being responsive to an aggregated description of traffic associated with said flow class, independent of from which flows, associated with said flow class, said traffic is aggregated from.

3. A method as in claim 1, wherein
 in response to said treatment information, said router limits an aggregate amount of traffic associated with said flow class independent of from which flows, associated with said flow class, said traffic is aggregated from.

4. A method as in claim 1, wherein
 said flow class assignment rules include a rule indicating that each particular new flow meeting said flow class assignment rules should be assigned to a distinct new flow class; with the effect that said distinct new flow class includes only said particular new flow.

5. A method as in claim 1, wherein
said router includes an access point in a wireless communication system; and
said steps of identifying a flow, and of identifying a flow class, are performed at a controller distinct from said router.

6. A method as in claim 1, wherein
said set of flow class assignment rules include generic aggregations of any combination of identifying features of flows, without sacrificing many speed in lookup with said flow class assignment rules.

7. A method as in claim 1, wherein
said treatment information includes one or more of: a firewall filter ID, a packet minimum length, a packet maximum length, a QoS protocol value, a packet drop policy, a priority value.

8. A method as in claim 1, including steps of
creating a flow class assignment rule in response to an administrator, said flow class assignment rule including a determination of whether to match a particular feature of a flow.

9. A method as in claim 1, including steps of
creating a flow class assignment rule in response to an administrator, said flow class assignment rule including a determination of whether to create a new flow group for each flow matching said flow class assignment rule.

10. A method as in claim 1, wherein
said set of flow class assignment rules includes a default treatment rule; and
said default treatment rule includes one or more of: an instruction to discard those packets treated according to said default treatment rule, an instruction to aggregate into a default flow those packets treated according to said default treatment rule.

11. A method as in claim 1, wherein
said steps of identifying a flow class are responsive to one or more administrative tags.

12. A method as in claim 11, wherein
said administrative tags include one or more of: a class of user, a current location of user, an application associated with said flow.

13. A method, including steps of
receiving a 1st packet at a router;
identifying a flow associated with said 1st packet;
identifying a flow class associated with said flow, said flow class being responsive to a plurality of distinct flow class assignment rules;
maintaining treatment information relating to routing a 2nd packet associated with one or more said flow class, said treatment information including at least one administrative policy; and
said maintained treatment information being responsive to a bounded-time lookup structure with respect to said flow and with respect to said flow class.

* * * * *